United States Patent [19]

Meli

[11] Patent Number: 5,793,508
[45] Date of Patent: Aug. 11, 1998

[54] WAVELENGTH-DIVISION MULTIPLEXING TELECOMMUNICATION SYSTEM AND METHOD PROVIDING A CONTROLLED SEPARATION OF THE OUTPUT CHANNELS

[75] Inventor: Fausto Meli, Piacenza, Italy

[73] Assignee: Pirelli Cavi S.p.A., Italy

[21] Appl. No.: 675,079

[22] Filed: Jul. 3, 1996

[30] Foreign Application Priority Data

Jul. 31, 1995 [IT] Italy ................... MI94A1676

[51] Int. Cl.⁶ ..................................... H04J 14/02
[52] U.S. Cl. ............................. 359/130; 359/127
[58] Field of Search ................... 359/124, 125, 359/127, 130, 140

[56] References Cited

U.S. PATENT DOCUMENTS

| | | | |
|---|---|---|---|
| 5,195,161 | 3/1993 | Adar et al. | 385/129 |
| 5,233,453 | 8/1993 | Sivarajan et al. | 359/117 |
| 5,475,780 | 12/1995 | Mizrahi | 385/37 |
| 5,504,609 | 4/1996 | Alexander et al. | 359/125 |
| 5,541,766 | 7/1996 | Mizrahi et al. | 359/337 |

FOREIGN PATENT DOCUMENTS

604040A1  6/1994  European Pat. Off. ......... H04J 14/02

OTHER PUBLICATIONS

Conference on Optical Fiber Communication (OFC '95) vol. 8, Feb. 26–Mar. 3, 1995 San Diego, CA.
Database InSPEC, IEE, London, GB—Byron et al—Inspec. No. 4847591.

*Primary Examiner*—Leslie Pascal
*Attorney, Agent, or Firm*—Brooks Haidt Haffner & Delahunty

[57] ABSTRACT

A multi-wavelength optical telecommunication method includes: generating at least two optical transmission signals of wavelengths different from each other, multiplexing the optical signals in a single transmission fibre, forming a multi-wavelength optical signal, transmitting, through the transmission fibre, the multi-wavelength optical signal including the optical transmission signals to a respective receiving station and separating the optical transmission signals, in which the step of separating the optical transmission signals includes: distributing the received multi-wavelength optical signal onto at least two output fibres; selectively reflecting a wavelength band of the multi-wavelength optical signal including at least one of the optical transmission signals, so that the reflected band propagates over the output fibre in an opposite direction to the multi-wavelength optical signal; separating the reflected band from the output fibre and feeding it, through a receiving fibre, to a respective receiver.

40 Claims, 2 Drawing Sheets

WAVELENGTH-DIVISION MULTIPLEXING TELECOMMUNICATION SYSTEM AND METHOD PROVIDING A CONTROLLED SEPARATION OF THE OUTPUT CHANNELS

DESCRIPTION

The present invention relates to an optical telecommunication system and method particularly appropriate for wavelength-division multiplexing (or WDM) transmission, in which the different channels are recognized and separated on reception.

For a wavelength-division multiplexing or WDM transmission, several channels, that is several transmission signals independent of each other, are required to be sent over the same line consisting of an optical fibre by multiplexing in the domain of optical wavelengths. The transmitted channels can be both digital and analog and are distinguisable from each other because each of them is associated with a specific wavelength, separated from that of the other channels.

In order to transmit a high number of channels making use of the so-called third transmission window of the silica-based fibres and the useful band of optical amplifiers, the wavelength separation between the channels conveniently is in the order of nanometers.

For a correct reception of such transmission signals it is therefore necessary to carry out a separation between the channels themselves so as to convey them to the respective users.

To this end, optical narrow-band filters can be used through which the selected channel alone can pass, so as to ensure the absence of undesired signals that would constitute noise if superposed with the selected channel. However, for the use of such filters both a high wavelength stability of the transmitted signal and a high intrinsic stability of the filter passband is required.

This problem is described for example in patent application GB 2260046 in which it is suggested to superimpose a pilot signal with the data to be transmitted, by detection of which pilot signal the filter passband can be adjusted.

In addition, known optical filters suffer from slip problems, based on which a selected wavelength for a passband keeps constant only over a limited period of time after setting. Said filters, in particular in the case in which they are provided with piezoelectric actuators or the like, are also subjected to hysteresis phenomena, based on which the selected passband wavelength value depends not only on the value of the related control quantity (a voltage for example), but also on the time law through which said quantity is applied to the filters.

U.S. Pat. No. 4,973,124 in the name of K. Kaede, discloses, among other things, a device for addition and drawing-off or bleeding of predetermined wavelengths to/from a wavelength-multiplexed signal propagating along an optical fibre. In one version the device is comprised of two polarization splitters, one quarter-wave plate and first and second Bragg-grating optical filters having the same Bragg-wavelength. From a plurality of signals at different wavelengths the device enables one single signal at the filters' Bragg-wavelength to be added or bled.

U.S. Pat. No. 4,740,951, in the name of J. Lizet et al., describes an integrated-optics device to demultiplex n light signals of different wavelengths forming a light beam transmitted from a first optical fibre towards n second optical fibres. The device comprises n Bragg-gratings disposed in cascade. The cascade arrangement involves a differential attenuation between the signals, by effect of the passage through a different number of Bragg-gratings, depending on the wavelength. At each of the n Bragg-gratings in integrated optics, in addition, an appropriate focusing optics of the corresponding signal diffracted towards one of the second optical output fibres is necessary, which will involve a very complicated device.

In one aspect, the present invention refers to an optical telecommunication method comprising the steps of:

generating at least two optical transmission signals, at predetermined wavelengths different from each other;

wavelength-division multiplexing said optical signals in a single transmission fibre, forming a multi-wavelength optical signal comprising said optical transmission signals;

transmitting said multi-wavelength optical signal through said optical fibre to a receiving station;

feeding said multi-wavelength optical signal comprising said optical transmission signals to a respective receiving unit in said station;

receiving the multi-wavelength optical signal in said receiving unit;

separating said optical transmission signals and feeding them to respective receivers, in which said step of separating said transmission optical signals comprises:

splitting the received multi-wavelength optical signal onto at least two output fibres;

in at least one of said two fibres, selectively reflecting one wavelength band of said multi-wavelength optical signal, said band having a width comprising at least one of said optical transmission signals, so that said reflected band propagates over said output fibre in an opposite direction to said multi-wavelength optical signal; and separating said band reflected from said output fibre and feeding it, through a receiving fibre, to a respective receiver.

Preferably, said step of splitting said received multi-wavelength optical signal comprises splitting said signal onto several output fibres the number of which is the same as that of the optical transmission signals.

Preferably, said selectively-reflected wavelength band comprises one alone of said transmission channels.

In a particular embodiment of the present invention said reflected wavelength band has at least a 2 nm width, more particularly a 5 nm width.

Preferably said step of splitting the multi-wavelength optical signal contemplates separating said signal into predetermined fractions.

Preferably said step of separating said reflected band from said output fibre comprises separating a predetermined signal fraction, in particular 50%.

In a second aspect, the present invention refers to an optical telecommunication system comprising:

an optical-signal transmitting station comprising means for generating transmission signals at at least two predetermined wavelengths, and wavelength-division multiplexing means for said transmission signals, on a single optical-fibre line;

a receiving station for said optical signals; and an optical-fibre line connecting said transmitting and receiving stations, in which said optical-signal receiving station comprises means for selectively separating said transmission signals from said single optical-fibre line, which comprises:

one signal splitter, adapted to divide the optical input signal onto several optical outputs;

at least one wavelength-selective reflector, having a reflected band comprising at least one of said predetermined wavelengths and connected with one of said optical outputs;

a second signal splitter connected with said selective reflector and adapted to receive said reflected band and divide said reflected band onto two outputs according to predetermined ratios; and an optical receiver connected with one of said outputs of the second signal splitter.

Preferably, said first and second signal splitters are non wavelength-selective splitters. In particular, said second signal splitter can be a directional coupler, in particular having a 50% division ratio.

In particular, said selective reflector is a Bragg-grating reflector of a fixed pitch or, preferably, of a variable pitch.

According to alternative versions, said selective reflector has a reflected band of at least 0.3 nm, or at least 2 nm, around a predetermined central wavelength, depending on the features of said transmission-signal generating means.

Preferably, said central wavelength of said selective reflector corresponds to the central emission wavelength of at least one of said transmission-signal generating means.

In particular, said selective reflector may comprise heat control means.

Preferably, said selective reflectors are of the same number as said transmission channels.

In a further aspect, the present invention relates to an optical wavelength-selective receiving unit comprising means for the selective separation of wavelength-division multiplexing transmission signals, which comprises:

one signal splitter, adapted to distribute an optical input signal on several optical outputs;

at least one wavelength-selective reflector, having a reflected band comprising at least one wavelength of one of said signals connected with one of said optical outputs;

a second signal splitter connected with said selective reflector and adapted to receive said reflected band and divide said reflected band onto two outputs according to predetermined ratios; and an optical receiver connected with one of said outputs of said second signal splitter.

Preferably, said first and second signal splitters are non wavelength-selective splitters. In particular, said second signal splitter can be a directional coupler, in particular with a 50% division ratio.

In particular, said selective reflector is a Bragg-grating reflector.

According to alternative versions, said selective reflector has a reflected band of at least 0.3 nm or at least 2 nm, around a predetermined central wavelength, depending on the features of said transmission signals.

In particular, said selective reflector may comprise heat control means.

Preferably, said selective reflectors are of the same number as said transmission channels.

More details will become apparent from the following description, with reference to the accompanying drawings, in which.

a) System description

Figure 1:
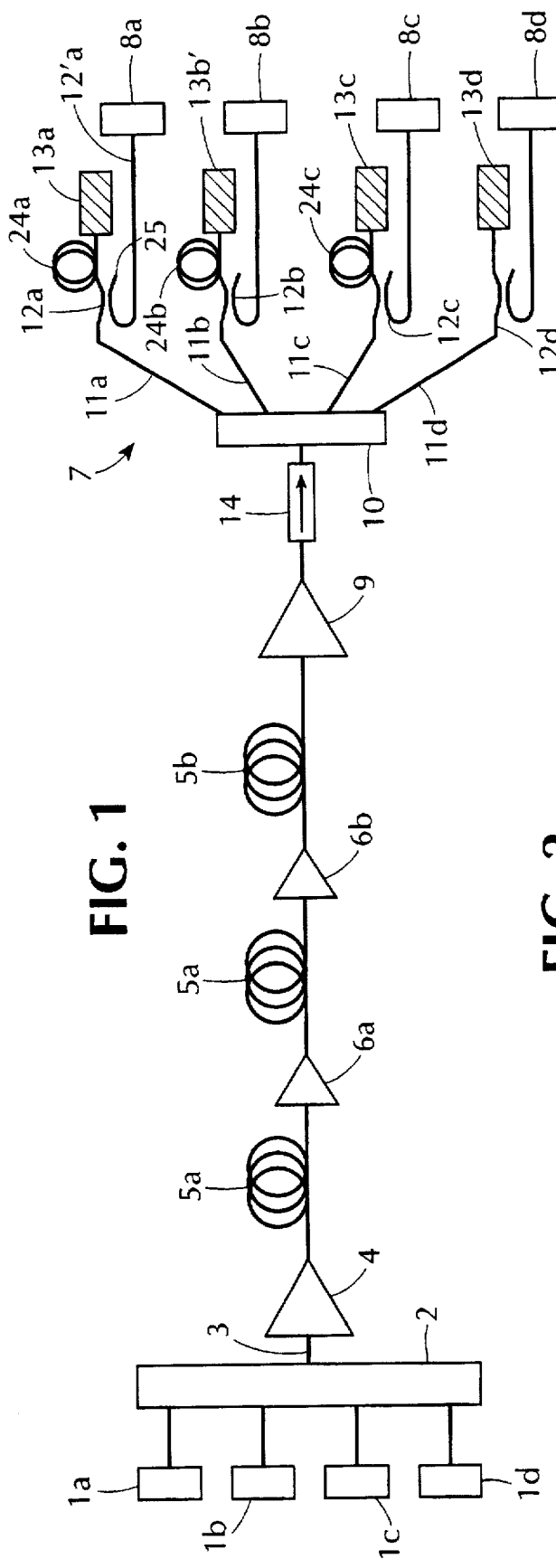
FIG. 1 is a diagram of a multi-wavelength telecommunication system according to the present invention.

As shown in FIG. 1, an optical wavelength-division multiplexing multi-channel telecommunication system according to the present invention contemplates several optical-signal sources, four for example, denoted in the figure by 1a, 1b, 1c, 1d respectively and having wavelengths $\lambda_1$, $\lambda_2$, $\lambda_3$, $\lambda_4$ included in the useful work band of the amplifiers disposed in succession in the system.

Said optical signals are fed to a signal combiner 2, or multiplexer, adapted to send the signals at $\lambda_1$, $\lambda_2$, $\lambda_3$, $\lambda_4$, simultaneously over a single optical output fibre 3.

In general, the signal combiner 3 is a passive optical device by which the optical signals transmitted over respective optical fibres are superposed on a single fibre. Devices of this type consist for example of fused-fibre couplers, in planar optics, microoptics and the like.

By way of example, an appropriate combiner is combiner 1×4 SMTC-0104-1550A-H commercialized by E-TEK DYNAMICS INC., 1885 Lundy Ave, San Jose, Calif. (USA).

Through fibre 3 said optical signals are sent to a power amplifier 4, which raises the signal power to a value sufficient to enable said signals to travel over a subsequent optical fibre portion extending before other amplifying means, while maintaining the required transmissive quality.

Thus, connected with power amplifier 4 is a first portion 5a of optical line usually consisting of a single-mode optical fibre of the step index type, which is introduced into an appropriate optical cable having a length of some ten (or hundred) kilometers. Said cable is for example about 100 kilometers long, with the amplifying means described below and the stated power levels.

In some cases, also optical fibres of the dispersion shifted type can be used.

At the end of this first portion 5a of optical line there is a first line amplifier 6a, adapted to receive the signals, attenuated during their travel over the fibre, and to amplify them to a sufficient level to enable them to be fed to several successive portions of optical line 5b, of the same features as the preceding one, and to the related line amplifiers 6b (in the figure, for the sake of graphic simplicity only two optical fibre portions 5b and one amplifier 6b are shown), thereby covering the overall transmission distance required for reaching a receiving station 7 in which the signals are splitted, depending on the different transmitted channels identified by the respective wavelengths, and sent to the respective receivers 8a, 8b, 8c, 8d.

The receiving station 7 comprises a pre-amplifier 9 adapted to receive the signals and amplify them compensating for losses given by the subsequent demultiplexing apparatuses, until achievement of a power level appropriate to the sensitivity of the receiving devices.

From pre-amplifier 9, signals are sent to a device adapted to split the optical signals fed to an input fibre onto several output fibres, separating them in relation to the respective wavelengths. This device, also referred to as demultiplexer, consists in the example herein described, of a fused-fibre splitter 10 separating the input signal into signals on several output fibres, four in this case, each of said signals being fed to respective fibres 11a, 11b, 11c, 11d, for connection with the respective receivers 8a, 8b, 8c, 8d.

For example, for splitter 10 a component of the same type as the already described signal combiner 2 may be used, mounted in an opposite configuration.

Fibres 11a, 11b, 11c, 11d are connected, through respective directional couplers 12a, 12b, 12c, 12d to selective-reflection filters 13a, 13b, 13c, 13d.

The receivers 8a, 8b, 8c, 8d are connected with a respective fibre coming out of the directional couplers 12, receiving the reflected signal from the respective selective-reflection filters 13a, 13b, 13c, 13d.

An optical isolator 14 is interposed between the pre-amplifier 9 and splitter 10.

Optical isolator 14 is preferably an optical isolator of a type independent of the polarization of the transmission signal, of an isolation greater than 35 dB and a reflectivity lower than −50 dB.

Appropriate isolators are for example model MDL I-15 PIPT-A S/N 1016 available from ISOWAVE, 64 Harding Avenue, Dover, N.J., USA.

The directional couplers 12 preferably are fused-fibre couplers 50:50 adapted to separate into even parts, in the output fibres, the optical power fed to an input fibre. An appropriate coupler is model SWBC2150PS210, manufactured by E-TEK DYNAMICS INC., 1885 Lundy Ave, San Jose, Calif. (USA).

The selective-reflection filters 13 preferably are of the same number as the transmitted channels and each reflect a wavelength corresponding to one of said channels.

Selective-reflection filters preferably adapted for use in the present invention are optical-waveguide distributed-Bragg-grating filters which reflect the radiation in a narrow wavelength band and transmit the radiation to the outside of said band.

Said filters consist of a portion of an optical waveguide, an optical fibre for example, along which the refractive index has a periodic variation and at said index variation there is a partial signal reflection. If the signal portions reflected at each index change are in timed relationship with each other there is a constructive interference and the incident signal is reflected.

The constructive interference condition, corresponding to the reflection maximum, is expressed by the relation $2 \cdot l = \lambda_s / n$, wherein l is the grating pitch formed by the refractive index variations, $\lambda_s$ is the wavelength of the incident radiation and n is the refractive index of the optical waveguide core. The described phenomenon is known in literature as distributed Bragg reflection.

The periodic variation of the refractive index can be achieved by known techniques, for example by exposing one optical-fibre portion deprived of the protective polymeric coating, to the interference fringes formed by an intense UV beam (as the one generated for example by an excimer laser, a frequency-doubled argon laser or a frequency-quadrupled Nd:YAG laser) which is caused to interfere with itself by an appropriate interferometer system, by a silicon phase mask for example, as described in U.S. Pat. No. 5,351,321.

The fibre, and in particular the fibre core, is thus exposed to a UV radiation of a periodically-varying intensity along the optical axis. In the core portions reached by the UV radiation of the greatest intensity, a partial breaking of the Ge-O bonds occurs, which will cause a permanent modification of the refractive index.

By selecting the grating pitch such that the constructive interference relation can be verified, the centre wavelength of the reflected band can be determined at will, following known criteria.

By this technique it is possible, for example, to produce filters having a reflected wavelength band at −3 dB, typically of 0.2–0.3 nm, reflectivity in the middle of the band until 99%, central wavelength of the reflected band susceptible of determination during the manufacturing step within about ±0.1 nm and variation of the central band wavelength at a temperature as low as 0.02 nm/°C.

For example, for a modulated transmission at 2.5 Gbit/s, with an external-modulation source, at a known central emission wavelength, to be determined for example at less than 0.01 nm, a total band of about 5 GHz is needed and a band of at least 10 GHz, corresponding to about 0.1 nm, is required from the grating.

Taking into account a tolerance in the central wavelength of the reflected band in the grating of about 0.1 nm, a corresponding minimum bandwidth for the grating is at least 0.3 nm.

This value can be achieved by fixed-pitch gratings.

Should the wavelengths of sources 1a, 1b, 1c, 1d have a wider tolerance interval, the availability of filters with a passband of corresponding width will be convenient, in order to include the source emission length within the band reflected by the filters.

In the case of sources consisting of a semiconductor laser of a commercially available type, for example typically having a known emission wavelength at less than ±1 nm (obtained by laser selection), it is possible to make optical-fibre distributed-Bragg-grating filters with a sufficiently large bandwidth in reflection by imposing a variable pitch to the grating, thereby making a so-called chirped grating.

For the purpose known techniques can be used, as taught for example in an article by P. C. Hill et al, published in Electronics Letters, vol. 30, No. 14, Jul. 7, 1994, pages 1172–1174.

Gratings of the above type are for example commercialized by PHOTONETICS Inc., Wakefield, Mass. (USA), for the desired reflection wavelengths.

To the purposes of the present invention, when not otherwise specified, for emission wavelength of a laser source it is intended a wavelength band, of predetermined width, centered around a central emission wavelength. Said central wavelength is generally selected based on the same constructive tolerances as adopted in selecting commercially available lasers.

To the purposes of the present invention and for the above described use, the power amplifier 4 is for example an optical fibre amplifier of a commercial type having the following features:

| | |
|---|---|
| input power | −13.5 to −3.5 dBm |
| output power | 12–14 dBm |
| work wavelength | 1530–1560 nm. |

An appropriate model is for example TPA/E-MW, marketed by the Assignee of this application.

Said power amplifier uses an erbium-doped active optical fibre, of the type described below.

By power amplifier it is intended an amplifier operating under saturation conditions, in which the output power depends on the pumping power, as described in detail in the European Patent No. EP 439,867, herein incorporated by reference.

To the ends of the present invention and for the above use, by pre-amplifier it is intended an amplifier put at the line end, capable of increasing the signal to be fed to the receiver to a value conveniently higher than the receiver's sensitivity threshold (for example in the case of a transmission at 2.5 Gbit/s, to such a value that the power reaching the receiver is between −26 and −11 dBm), while simultaneously introducing the lowest possible noise and keeping the signal equalization.

Pre-amplifier 9 is, for example, an optical fibre amplifier of a commercially available type, having the following features:

| overall power input | -20 to -9 dBm |
|---|---|
| output power | 0-6 dBm |
| work wavelength | 1530-1560 nm. |

An appropriate model is, for example, RPA/E-MW, commercialized by the Assignee of this application.

Said amplifier makes use of an erbium-doped active optical fibre of the type described later on.

The configuration of the above-described transmission system appears to be particularly appropriate to provide the desired performance, in particular for wavelength-division multiplexing transmission over several channels, in the presence of a particular selection of the properties of the line amplifiers being part of it, above all as regards the capability of transmitting the selected wavelengths without some of them being attenuated as compared with others.

In particular, a uniform behaviour for all channels can be ensured, in the wavelength band included between 1530 and 1560 nm, in the presence of amplifiers adapted to operate in cascade, making use of line amplifiers which are provided for having a substantially uniform (or "flat") response to the different wavelengths, in a cascade operation.

b) Line amplifier

Figure 2:
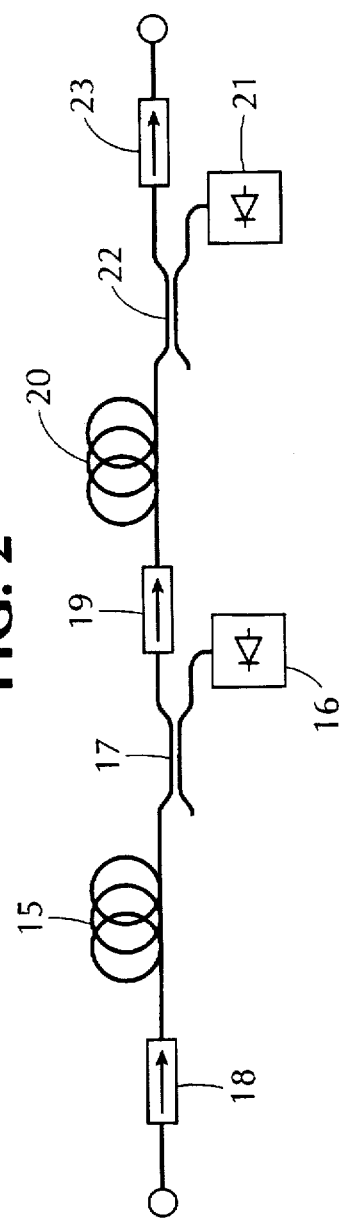
FIG. 2 is a diagram of a line amplifier for use in the system of FIG. 1.

For the above purpose, an amplifier provided for use as a line amplifier can be made following the diagram shown in FIG. 2 and it comprises one active fibre 15, doped with erbium, and a related pump laser 16, connected therewith through a dichroic coupler 17. One optical isolator 18 is disposed upstream of the fibre 15, in the travel direction of the signal to be amplified, whereas a second optical isolator 19 is disposed downstream of the active fibre. In the case of a two-stage embodiment, the amplifier further comprises a second erbium-doped active fibre 20 associated with a corresponding pump laser 21 via a dichroic coupler 22, which also is connected for countercurrent pumping in the example shown. Downstream of fibre 20 there is therefore another optical isolator 23.

The pump lasers 16, 21 are for example lasers of the Quantum Well type, having the following features:

| emission wavelength | $\lambda_p$ = 980 nm; |
|---|---|
| maximum optical output power | $P_u$ = 80 mW. |

Lasers of the above type are manufactured for example by: LASERTRON INC., 37 North Avenue, Burlington, Mass. (USA).

Dichroic couplers 17, 22 are in this example fused-fibre couplers, formed of single-mode fibres at 980 and within the wavelength band of 1530–1560 nm, with a variation <0.2 dB in the optical output power, depending on polarization.

Dichroic couplers of the above type are known and available on the market and are produced, for example, by GOULD Inc., Fibre Optic Division, Baymeadow Drive, Glem Burnie, Md. (USA), and by SIFAM Ltd., Fibre Optic Division, Woodland Road, Torquay, Devon (GB).

Optical isolators 18, 19, 23 preferably are optical isolators of a type independent of the polarization of the transmission signal, with an isolation greater than 35 dB and a reflectivity lower than −50 dB.

Appropriate isolators are for example model MDL-I-15 PIPT-A S/N 1016 available from ISOWAVE, 64 Harding Avenue, Dover, N.J. (USA).

In the described system the line amplifiers are provided for operation with an overall optical output power of about 14 dBm, with a gain of about 30 dB.

In the diagram shown in FIG. 1 the two stages of the line amplifier are disposed in a counter-propagating configuration. In each application the most appropriate configuration should be at all events identified in connection with the specific features of the system.

In the above described amplifiers, an erbium-doped active fibre is employed, as described in detail in the Italian patent application No. MI94A 000712 of Apr. 14, 1994 of the same Assignee of this application, which is herein incorporated by reference and the contents of which are hereinafter summarized.

The composition and optical features of the employed fibre are briefly stated in the following table 1.

TABLE 1

| $Al_2O_3$ | | $GeO_2$ | | $La_2O_3$ | | $Er_2O_3$ | | | |
|---|---|---|---|---|---|---|---|---|---|
| wt % | (mol %) | wt % | (mol %) | wt % | (mol %) | wt % | (mol %) | NA | $\lambda_c$ nm |
| 4 | (2.6) | 18 | (11.4) | 1 | (0.2) | 0.2 | (0.03) | 0.219 | 911 | wherein:

wt %=(average) percent content by weight of oxide in the core mol %=(average) percent content by mole of oxide in the core NA=Numerical Aperture $(n1^2-n2^2)^{1/2}$ $\lambda_c$=cut-off wavelength (LP11 cut-off).

Analyses of the compositions were made on a preform (before spinning of the fibre) by a microprobe combined with a scanning electron microscope (SEM HITACHI).

The analyses were conducted at 1300 magnification on discrete points disposed along a diameter and separated from each other by 200 μm.

The fibre in question was made following the technique of the vacuum plating, within a quartz glass tube.

The incorporation of germanium as the dopant into the $SiO_2$ matrix in the fibre core is obtained during the synthesis step.

The incorporation of erbium, alumina and lanthanum into the fibre core was obtained by the so called "doping-in-solution" technique, in which an aqueous solution of the dopant chlorides is put into contact with the synthesis material of the fibre core, while it is in a particulate state, before hardening of the preform.

More details concerning the "doping-in-solution" technique can be found for example in U.S. Pat. No. 5,282,079 which is herein incorporated by reference.

For example, in the above described two-stage configuration, the active fibre 15 can be about 8 m long; the second active fibre 20 can be about 11 m long.

The described configuration in particular applies to transmissions over distances on the order of about 500 km, at a high transmission speed, 2.5 Gbit/s for example (achieving, with four multiplexed wavelengths, a transmission capability equal to 10 Gbit/s over a single wavelength), making use of four line amplifiers, one power amplifier and one pre-amplifier.

With the above described configuration, a high-speed transmission, over several channels, can be obtained using wavelengths for example of 1535 nm; 1543 nm; 1550 nm and 1557 nm, generated for example by respective lasers and suitably modulated.

Figure 3:
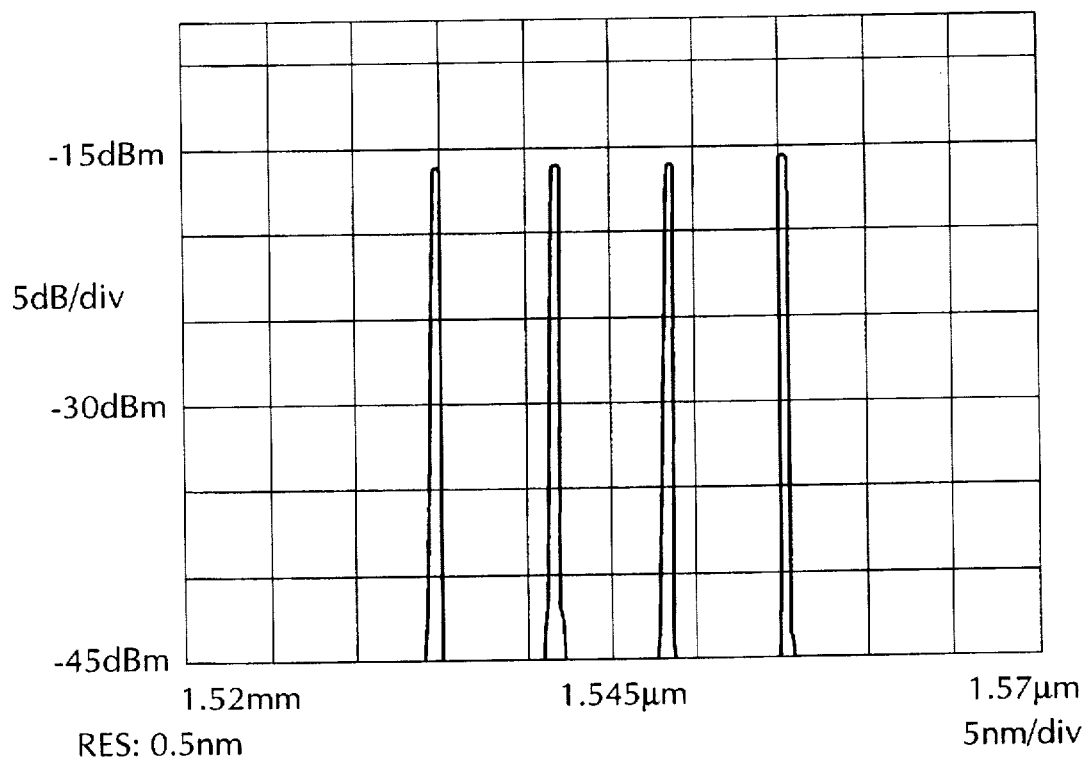
FIG. 3 is a spectrum of the detected signal at the multiplexer output port of the transmitting station in the system of FIG. 1.
Figure 4:
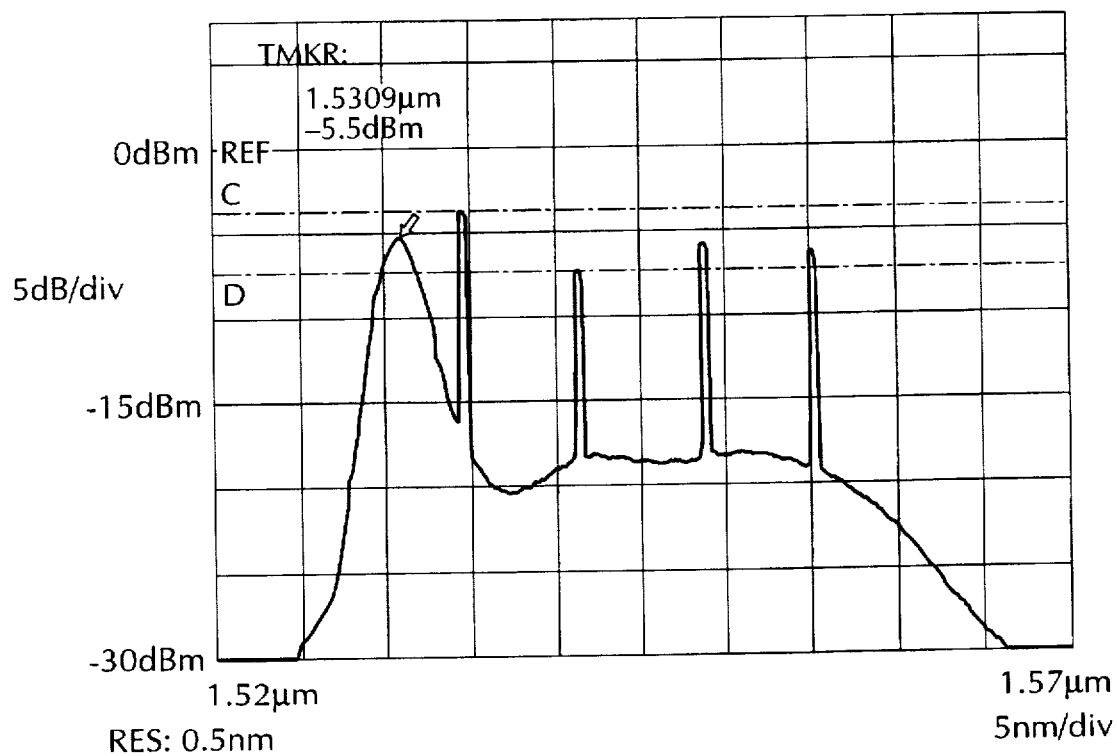
FIG. 4 is a spectrum of the detected signal at the pre-amplifier output port in the system of FIG. 1.

Shown in FIG. 3 is a spectrum of the overall signal fed over the line, whereas the signal inputted to splitter 10 is shown in FIG. 4.

As it appears from a comparison between the graphs, the spontaneous emission of the amplifiers has accumulated in the line and is superposed with the transmitted channels.

c) Channel selection

In order to send the respective channel to each receiver 8a–8d, splitter 10 splits out the whole optical signal received, on the respective outputs 11a, 11d. The signal on each output therefore directly reaches the respective selective reflector 13 which reflects the only band corresponding to it, whereas the remaining part of the spectrum is ejected from the fibre end carrying the selective reflector.

For the purpose of avoiding spurious reflections, out of the band corresponding to the selected channel, the fibre end on which the grating is formed is terminated in a reflection-preventing manner, for example by an oblique cutting or similar means, well known in the art.

The signal reflected from grating 13a, propagating back to the directional coupler 12a is then sent to fibre 12'a coming out of the coupler, in a proportion given by the division ratio of the coupler itself, 50% for example, and is subsequently sent to the respective receiver 8a.

Signals corresponding to gratings 13b, 13c, 13d are reflected in the same manner and sent to the respective receivers 8b, 8c, 8d.

Gratings 13a–13d are selected such as to have a central wavelength of the reflection band centered on the wavelength of each of the channels transmitted by the respective transmitters, ensuring a correct reception of the selected channel, while the remaining channels are excluded.

Optical isolator 14 prevents the reflected signal portion passing through couplers 12 and not directed towards the respective receiver 8 from coming back to pre-amplifier 9 and causing operative disturbances in said pre-amplifier.

Should the pre-amplifier itself incorporate an optical isolator on its output fibre, isolator 14 can be eliminated.

In the described configuration the overall optical power inputted to splitter 10 is for example about 5 dBm (with a power per channel equal to about −5 dBm, as viewed from the graph in FIG. 4). Splitter 10, by splitting out the input power on four outputs, introduces an attenuation of about 7 dB, whereas each directional coupler 12, if it is of the above stated 50/50 type, introduces an attenuation of about 3.5 dB for each passage (inclusive of the splicing losses). In this manner, the overall attenuation on each channel between the input to splitter 10 and the input to each receiver 8 is about 14 dB, with a power at the receiver of about −19 dBm, which is appropriate for the sensitivity of the receivers in use.

The signal portion coming out of the branch 25 of one or more directional couplers 12a–12d can be utilized for control functions or the like.

The high stability of the wavelength reflected from gratings 13, both in time and in the presence of possible temperature ranges, ensures the correct reception of the selected channel.

If variations in the emission wavelength of the transmission lasers, high variations in the environmental temperature or other phenomena occur that alter the central wavelength of the transmitted channels or the grating reflection wavelength, it is possible to operate a fine tuning of the wavelength reflected from the gratings, by controlling the temperature of same for example.

In a particular embodiment of the present invention, portions 24a–24c of optical fibre are interposed between the directional couplers 12a–12c and the related grating 13a–13c, which portions have lengths greater than half the coherence length in the fibre of the optical sources used and with a difference between the lengths greater than said half.

By coherence length in the fibre it is intended the fibre length $L_c$ in which the signal generated from a given source keeps coherent, defined as $L_c=v/\pi\Delta v$, wherein v is the propagation speed of the radiation along the fibre and $\Delta v$ is the line width of the communication signal source.

For example, tunable semiconductor lasers of the DFB type, as used in transponder TXT-EM commercialized by the Assignee of this application, have a line width of about $\Delta\theta=10$ MHz. Based on the above relation, value $L_c=6.5$ m is drawn for the coherence length in the fibre of the employed sources.

In particular, if $L_c$ is the greatest length among the transmitter lasers adopted in the system, the length of a first one of said optical fibre portions 24a is $L_1 \geq L_2$; the length of a second one of said optical fibre portions 24b is $L_2 \geq L_c$; and the length of a third one of said optical fibre portions 24c is $L_3 \geq 3/2\ L_c$.

It should be noted that, since a phase shift of the channels between each other is desired, it is necessary to apply the delay lines 24a–24c to three out of four of the wavelengths present, so that said three wavelengths are out of phase with respect to the fourth one that has not undergone any delay.

In this manner, by effect of the double passage through fibre portions in which there is a length difference greater than half the coherence length of the sources in the fibre, signals reflected towards splitter 10 are phase-uncorrelated between each other, thus avoiding the possible occurrence of instability phenomena due to a partial recombination of the four channels in splitter 10.

The described structure guarantees that for all channels there will be the same attenuation, while ensuring the transmission uniformity.

I claim:

1. An optical telecommunication method comprising the steps of:

generating at least two optical transmission signals at predetermined wavelengths different from each other and each having a coherence length;

wavelength-division multiplexing said optical signals in a single transmission fibre, forming a multi-wavelength optical signal comprising said optical transmission signals;

transmitting said multi-wavelength optical signal through said optical fibre to a receiving station;

feeding said multi-wavelength optical signal comprising said optical transmission signals to a receiving unit in said station;

receiving the multi-wavelength optical signal in said receiving unit; and separating said optical transmission signals from the received multi-wavelength optical signal at the receiving unit, wherein said step of separating comprises:

splitting the received multi-wavelength optical signal onto at least two optical output paths; and introducing a predetermined delay in at least one of the two optical output paths for uncorrelating the phase of one of the optical transmission signals on the one optical output path in which the delay is introduced with respect to the phase of another of the optical transmission signals on the said one optical output path and the optical transmission signals on the other of said at least two optical output paths; and feeding the separated optical transmission signals to respective receivers.

2. An optical telecommunication method according to claim 1, wherein the step of separating said optical transmission signals further comprises:

in at least one of said at least two optical output paths, selectively reflecting the signals in one wavelength band of said multi-wavelength signal, said reflected band having a width comprising at least one of said optical transmission signals, so that the signals in said reflected band propagate over said one selectively reflecting optical output path in an opposite direction to said multi-wavelength signal;

separating the signals in said reflected band from said one selectively reflecting optical output path; and feeding the separated signals in the reflected band from said one selectively reflecting optical output path to one of the receivers.

3. An optical telecommunication method according to claim 2, characterized in that the signals in said reflected band comprise only one of said optical transmission signals.

4. An optical telecommunication method according to claim 3, characterized in that said reflected wavelength band is at least 2 nm wide.

5. An optical telecommunication method according to claim 4, characterized in that said reflected wavelength band is 5 nm wide.

6. An optical telecommunication method according to claim 2, characterized in that said step of separating the signals in said reflected band from said one selectively reflecting optical output path comprises separating a predetermined signal fraction.

7. An optical telecommunication method according to claim 6, characterized in that said predetermined signal fraction of the signals in said reflected band separated from said one selectively reflecting optical output path is 50%.

8. An optical telecommunication method according to claim 1, characterized in that said step of splitting said received multi-wavelength optical signal comprises dividing said received multi-wavelength optical signal onto a plurality of optical output paths, wherein the number of optical output paths is the same as the number of the optical transmission signals forming the multi-wavelength optical signal.

9. An optical telecommunication system according to claim 8, wherein each of said plurality of optical output paths comprises an output optical fiber.

10. An optical telecommunication method according to claim 1, wherein said predetermined delay is greater than said coherence length of one of the optical transmission signals which form the multi-wavelength signal.

11. An optical telecommunication method according to claim 1, characterized in that said step of splitting the multi-wavelength optical signal comprises separating said multi-wavelength optical signal into predetermined fractions.

12. An optical telecommunication system comprising:

an optical-signal transmitting station comprising means for generating optical transmission signals at at least two predetermined wavelengths and each having a coherence length and wavelength-division multiplexing means for multiplexing said optical transmission signals on a single optical fiber line;

a receiving station for said optical transmission signals, said receiving station comprising a first signal splitter, adapted to divide said multiplexed optical transmission signals onto at least two optical output paths; and an optical fiber line connecting said transmitting and receiving stations, characterized in that said receiving station comprises a delay line of predetermined length connected with one of said at least two optical output paths for uncorrelating the phase of one of the optical transmission signals on the one optical output path connected with the delay line with respect to the phase of another of the optical transmission signals on the one optical output path and the optical transmission signals on the other of said at least two optical output paths.

13. An optical telecommunication system according to claim 12, characterized in that said first signal splitter is a non-wavelength-selective splitter.

14. An optical telecommunication system according to claim 12, wherein said delay line comprises a portion of optical fiber.

15. An optical telecommunication system according to claim 12, wherein said predetermined length is greater than one-half of said coherence length of one of said optical transmission signals.

16. An optical telecommunication system according to claim 12, wherein said receiving station comprises:

at least one wavelength-selective reflector, having a reflected band comprising at least one of said predetermined wavelengths and connected with one of said at least two optical output paths;

a second signal splitter connected with said wavelength-selective reflector and adapted to receive said reflected band and divide the signals in said reflected band onto two second optical output paths according to predetermined ratios; and an optical receiver connected with one of said second optical output paths of the second signal splitter.

17. An optical telecommunication system according to claim 16, characterized in that said second signal splitter is a non-wavelength-selective splitter.

18. An optical telecommunication system according to claim 17, characterized in that said second signal splitter is a directional coupler.

19. An optical telecommunication system according to claim 18, characterized in that said directional coupler has a 50% division ratio.

20. An optical telecommunication system according to claim 16, characterized in that said wavelength-selective reflector is a Bragg-grating reflector.

21. An optical telecommunication system according to claim 20, characterized in that said wavelength-selective reflector is a Bragg-grating reflector of a fixed pitch.

22. An optical telecommunication system according to claim 20, characterized in that said wavelength-selective reflector is a Bragg-grating reflector of a variable pitch.

23. An optical telecommunication system according to claim 20, characterized in that said wavelength-selective reflector comprises heat control means.

24. An optical telecommunication system according to claim 16, characterized in that said wavelength-selective reflector has a reflected band of at least 0.3 nm around a predetermined central wavelength.

25. An optical telecommunication system according to claim 16, characterized in that said wavelength-selective reflector has a reflected band of at least 2 nm around a predetermined central wavelength.

26. An optical telecommunication system according to claim 16, characterized in that the central wavelength of said wavelength-selective reflector is the central emission wavelength of at least one of said optical transmission signal generating means.

27. An optical telecommunication system according to claim 16, characterized in that the number of said at least one wavelength-selective reflector is the same as the number of said optical transmission signals.

28. An optical telecommunication system according to claim 16, wherein said delay line is interposed between said second splitter and said wavelength-selective reflector.

29. An optical wavelength-selective receiving unit comprising means for the selective separation of optical transmission signals from a wavelength-division multiplexing signal formed from said optical transmission signals, each of said optical transmission signals having a coherence length, wherein said selective separation means comprises:

a first signal splitter, adapted to distribute an optical input signal onto at least two first optical output paths;

at least one wavelength-selective reflector, having a reflected band comprising at least one wavelength of one of said optical transmission signals, connected with one of said at least two first optical output paths;

a second signal splitter connected with said wavelength-selective reflector and adapted to receive said reflected band and divide the signals in said reflected band onto two second optical output paths according to predetermined ratios;

a delay line of predetermined length interposed between said second signal splitter and said wavelength-selective reflector for uncorrelating the phase of one of the optical transmission signals on the one first optical output path with respect to the phase of another of the optical transmission signals on the one first optical output path and the optical transmission signals on the other of said at least two first optical output paths; and an optical receiver connected with one of said second optical paths of said second signal splitter.

30. An optical receiving unit according to claim 29, characterized in that said first signal splitter is a non-wavelength-selective splitter.

31. An optical receiving unit according to claim 29, characterized in that said second signal splitter is a non-wavelength-selective splitter.

32. An optical receiving unit according to claim 31, characterized in that said second signal splitter is a directional coupler.

33. An optical receiving unit according to claim 32, characterized in that said directional coupler has a 50% division ratio.

34. An optical receiving unit according to claim 29, characterized in that said wavelength-selective reflector is a Bragg-grating reflector.

35. An optical receiving unit according to claim 29, characterized in that said wavelength-selective reflector has a reflected band of at least 0.3 nm around a predetermined central wavelength.

36. An optical receiving unit according to claim 29, characterized in that said wavelength-selective reflector has a reflected band of at least 2 nm around a predetermined central wavelength.

37. An optical receiving unit according to claim 29, characterized in that said wavelength-selective reflector comprises heat control means.

38. An optical receiving unit according to claim 29, characterized in that the number of said at least one wavelength-selective reflector is the same as the number of said optical transmission signals.

39. An optical receiving unit according to claim 29, wherein said delay line comprises a portion of optical fiber.

40. An optical receiving unit according to claim 29, wherein said predetermined length is greater than one-half of said coherence length of one of said optical transmission signals.

* * * * *